United States Patent [19]

Delbeck et al.

[11] Patent Number: 4,865,672
[45] Date of Patent: Sep. 12, 1989

[54] PROCESS FOR BONDING TWO SUBSTANTIALLY FLAT ELEMENTS WITH SPACERS

[75] Inventors: Jean-Willem Delbeck, Weinheim; Anton M. Schleicher, Heidelberg, both of Fed. Rep. of Germany

[73] Assignee: Teroson GmbH, Heidelberg, Fed. Rep. of Germany

[21] Appl. No.: 203,185

[22] Filed: Jun. 7, 1988

[30] Foreign Application Priority Data

Jun. 12, 1987 [DE] Fed. Rep. of Germany ....... 3719599

[51] Int. Cl.$^4$ .......................... B29D 9/00; B32B 17/10
[52] U.S. Cl. ..................................... 156/109; 118/308; 156/107; 156/292
[58] Field of Search ............... 156/107, 109, 292, 290; 428/34; 350/320, 339 R, 343; 239/422, 426, 434, 336; 427/168, 196, 137; 118/310, 303, 308; 404/94

[56] References Cited

U.S. PATENT DOCUMENTS

| 2,821,890 | 2/1958 | Wilson | 118/310 X |
| 3,995,941 | 12/1976 | Nagahara et al. | 350/343 |
| 4,640,583 | 2/1987 | Hoshikawa et al. | 350/339 R |

FOREIGN PATENT DOCUMENTS

| 2130773 | 3/1972 | Fed. Rep. of Germany. | |
| 0030259 | 8/1974 | Japan | 156/276 |
| 0074114 | 5/1982 | Japan | 156/325 |

Primary Examiner—Michael W. Ball
Assistant Examiner—Steven D. Maki
Attorney, Agent, or Firm—Vincent L. Fabiano; William W. McDowell, Jr.

[57] ABSTRACT

In a process for bonding two substantially flat elements, a highly viscous sealant containing balls as spacers is applied to a first element in a thickness at least corresponding to the desired distance from the second element and the latter is engaged and pressed onto the first element. The balls (6) are successively added to the sealant in an applicator nozzle (2) prior to the application of the sealant. This process can be performed with an apparatus having an applicator nozzle (2) for the supply and application of the sealant (4) and a ball supply device (10). The latter contains a supply duct (12) for supplying the balls (6), an outlet tube (14) connected at an angle to supply duct (12) and issues via an opening (16) laterally into the applicator nozzle (2) and an impact plunger (18), which is movable by the end remote from applicator nozzle (2) into the outlet tube (14).

5 Claims, 1 Drawing Sheet

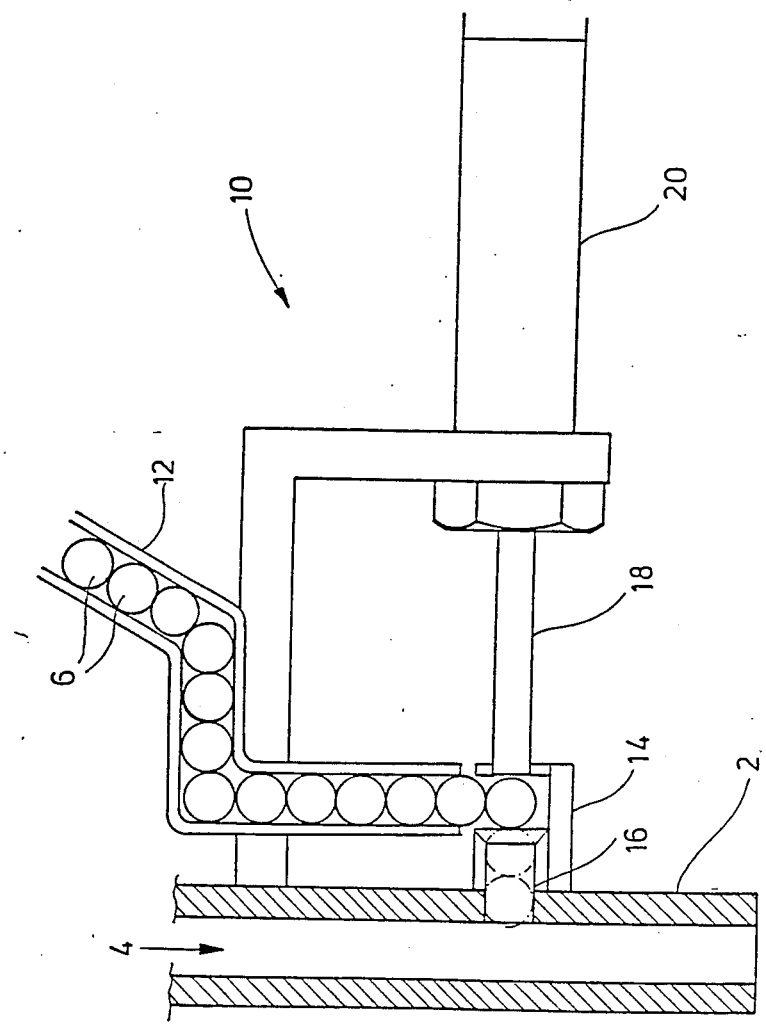

PROCESS FOR BONDING TWO SUBSTANTIALLY FLAT ELEMENTS WITH SPACERS

The invention relates to a process and to an apparatus for bonding two substantially flat elements, in which to the first element is applied a highly viscous sealant by means of an applicator nozzle in a thickness corresponding to the desired spacing from the second element and the second element is placed onto the first element by means of spacers and pressed for fixation.

Such a process is e.g. used for the production of double glazing systems, the elements being glass panes or plates and metal, preferably aluminium profiles are used as spacers for fixing the two plates at a clearly defined reciprocal distance. These metal profiles are bonded to the first plate in a separate operation before or after applying the highly viscous sealant. Generally the sealant is applied along the complete lateral edges of the first plate by means of an applicator nozzle and the metal profile is positioned on the inside of the sealant, so that following the application of the second plate there is an air-tight seal of the gap through the all-round sealant.

However, the disadvantage of this process is that a separate operation is required for arranging and fixing the metal profiles serving as spacers and said operation must be performed either before or after applying the sealant, which involves increased material and labour costs. In addition, the position and length of the metal profiles must be adapted to the course of the sealant and the lateral edges of the plates. Therefore automation of this process is difficult and expensive.

The published German patent application No. 21 30 773 relates to an adhesive containing a filler as spacer. The filler may be glass balls. It is a major disadvantage of such an adhesive that it cannot be applied automatically because the filter and in particular the glass balls which are randomly distributed in the adhesive tend to block the applicator nozzle.

It is an object of the present invention to so simplify the process of the aforementioned type that there is no need to fix the spacers between the element in an operation separate from the application of the sealant.

It is another object of the present invention to so improve an apparatus with an applicator nozzle for supplying and applying the sealant that the process according to the invention can be carried out automatically.

According to the invention there is provided a process for bonding two substantially flat elements, in which to the first element is applied a highly viscous sealant containing balls as spacers in a thickness at least corresponding to the desired spacing from the second element and the second element is engaged and pressed onto the first element, wherein said balls are successively added to the sealant in an applicator nozzle prior to the application of the sealant.

Thus, it is possible to apply the sealant and the spacers together in a single operation. After the application of the sealant containing the balls to the first element, the second element is engaged and pressed in the direction of the first element until the balls embedded in the sealant come into contact with both elements, so that the two elements are fixed with a spacing defined by the diameter of the balls.

The process according to the present invention in particular simplifies the manufacture of double glazing systems, because there is no longer any need for the spacers to be positioned in a separate operation and instead this takes place simultaneously with the application of the sealant.

The invention is also suitable for the easier fitting of glass plates to automobiles or cars. For compensating manufacturing tolerances, which in particular occur in the case of convex plates, the car plates are fixed and bonded by means of spacers to the car body flange, which also requires a separate operation. As this operation is unnecessary with the process according to the invention, it is possible to carry out the fitting of glass plates to car bodies much more simply, rapidly and inexpensively, which is especially advantageous with automated production.

The balls are preferably made from a solid material, such as glass, plastic, ceramic or steel, because it is necessary to ensure a clearly defined spacing between both plates.

According to a preferred embodiment of the invention the balls are successively added to the sealant in a fixed time interval prior to the application thereof to the first plate, so that following the application of the sealant there is automatically a specific reciprocal spacing of the balls embedded in the sealant.

When the inventive process is used for producing double glazing systems and the sealant is applied along the entire lateral edges of a first plate, preferably following the application of the sealant to the first plate and prior to the engagement of the second plate, a small pressure compensating tube is inserted in the sealant, following the engagement of the second plate a vacuum is applied to the pressure compensating tube, after which the latter is sealed and then the vacuum between the two plates is removed again when the sealant has hardened. Through producing producing a vacuum between the two plates by means of a pressure compensating tube, the two plates are pressed against one another during the hardening of the sealant and are consequently fixed to one another.

The apparatus according to the invention comprises a ball supply device with a supply duct for supplying the balls, with an outlet tube connected at an angle to the supply duct that issues via an opening laterally into the applicator nozzle and with an impact plunger, which can be moved into the outlet tube by the end remote from the applicator nozzle, the inside diameter of the applicator nozzle, the supply duct and the outlet tube being larger and the external diameter of the impact plunger being smaller than the diameter of the balls.

Thus, according to the present invention a conventional applicator nozzle used for guiding and applying the sealant is combined with the ball supply device, through which the balls are passed into the applicator nozzle and consequently added to the sealant located therein prior to the discharge thereof. The balls are passed by means of the supply duct into the following outlet tube and from there are moved by means of the impact plunger into the applicator nozzle. It is ensured that the impact plunger and supply duct issuing into the outlet tube do not impede one another by the fact that the supply duct is connected at an angle to the outlet tube. Thus, the balls are fed laterally by the supply duct into the outlet tube before being moved by the impact piston through the outlet tube into the applicator nozzle.

The apparatus of the invention is usable with particular advantage for the automated manufacture of double glazing systems (insulating glass plates), as well as for the automated fixing of glass plates to motor vehicle bodies. The passage and delivery of sealant through the applicator nozzle, the supply of the balls and the movement of the impact plunger can be simply mechanised by suitable devices and the balls can also be supplied through the supply duct with the aid of gravity. The working sequence of the inventive apparatus can be easily controlled by using a control mechanism.

According to an advantageous further development the outlet tube is connected at an angle to the supply duct and also issues at an angle into the applicator nozzle. This leads to a particularly compact arrangement, because the supply duct is located in the same plane as the applicator nozzle, at least in the connection area with the outlet tube.

The impact plunger is preferably driven by a pneumatic cylinder, because such a drive leads to a very simple construction.

The invention is explained in greater detail hereinafter relative to the single drawing, which in section shows an embodiment of the invention.

The drawing shows the essential components of the apparatus, namely an applicator nozzle 2, through which the sealant is passed and delivered in the direction of arrow 4, as well as a ball supply device 10. The latter has a supply duct 12 for supplying balls 6 and an outlet tube 14, which is connected at right angles to supply duct 12 and issues at right angles via an opening 16 laterally into the applicator nozzle 2. There is also an impact plunger 18, which can be driven by a pneumatic cylinder 20 and is movable by the end remote from the applicator nozzle 2 into the outlet tube 14. To ensure that the supply duct 12 and impact plunger 18 do not impede one another, a right-angled connection of supply duct 12 to outlet tube 14 is provided.

The sealant can be passed through applicator nozzle 2 with the aid of a pump and the balls 6 are supplied by means of a suitable conveying mechanism. However, the balls 6 can be supplied through supply duct 12 with the aid of gravity, so that then there is no need for separate conveying mechanisms.

The process for bonding two substantially flat elements with the aid of the described apparatus will now be described.

Whilst the highly viscous sealant is pumped through applicator nozzle 2 in the direction of arrow 4, balls 6 are successively forced by impact plunger 18 through outlet tube 14 and opening 16 from the side into applicator nozzle 2 and introduced into the sealant located therein. The sealant with the balls 6 embedded therein is then discharged from applicator nozzle 2 and applied to the first element. The impact plunger 18 is only operated at certain time intervals, so that the balls are introduced into the sealant at given times and consequently following the application of the sealant to the element the balls always have a specific reciprocal spacing.

The second element is then engaged and pressed against the first element until the balls embedded in the sealant come into contact with both elements. In order that the balls can serve as spacers for fixing the two elements to one another with a given reciprocal spacing, they are made from a solid material such as glass, plastic, ceramic or steel.

If when using the process according to the present invention for producing double glazing systems, the sealant is applied fully along the lateral edges of the first plate then, prior to the application of the second plate, a small pressure compensating tube can be inserted, to which a vacuum is applied after engaging the second plate. Thus, a vacuum is formed in the gap between the two plates sealed by the sealant placed all round the lateral edges of the plates in strip-like manner, so that the two plates are pressed against one another and consequently fixed. The pressure compensating tube is kept closed until the sealant has hardened and then the vacuum is removed again. This leads to a double glazing system, in which the spacing between the two plates is broughtabout by the balls in the sealant. As the balls are surrounded by sealant, this simultaneously ensures a reliable seal with respect to the outside of the gap between the two plates.

We claim:

1. Process for bonding two substantially flat elements, in which to the first element is applied a highly viscous sealant containing balls as spacers in a thickness at least corresponding to the desired spacing from the second element using an applicator nozzle and the second element is engaged and pressed onto the first element, characterized in that said balls are added, one at a time with uniform spacing between the balls, to the sealant in the applicator nozzle prior to the application of the sealant such that following the application of the sealant with the applicator nozzle there is automatically a specific reciprocal spacing of the balls embedded in the sealant.

2. Process according to claim 1, characterized in that the balls are made from a solid material such as glass, plastic, ceramic or steel.

3. Process according to claims 1 or 2, characterized in that the elements are plates, particularly glass plates.

4. Process according to claim 1 to 2, in which the sealant is applied entirely along the lateral edges of the first plate, characterised in that after applying the sealant to the first plate and prior to engaging the second plate, a small pressure compensating tube is inserted in the sealant, a vacuum is applied to the pressure compensating tube after engaging the second plate, the pressure compensating tube is then closed and after hardening the sealant the vacuum between the two plates is removed again.

5. A process of claim 1 or 2 wherein a plunger is used to add the balls to the sealant.

* * * * *